United States Patent [19]

Radl et al.

[11] Patent Number: 4,782,238

[45] Date of Patent: Nov. 1, 1988

[54] APPARATUS FOR GENERATING EDGE POSITION SIGNALS FOR USE IN LOCATING AN ADDRESS ELEMENT ON A MAILPIECE

[75] Inventors: Bruce M. Radl, Stow; John J. Lumia, North Reading; Bennett I. Gold, Worcester, all of Mass.

[73] Assignee: Eastman Kodak Company, Rochester, N.Y.

[21] Appl. No.: 111,004

[22] Filed: Oct. 20, 1987

[51] Int. Cl.[4] .......... G01N 21/86

[52] U.S. Cl. .......... 250/561; 250/223 R

[58] Field of Search .......... 250/223 R, 560, 561; 356/376, 381, 384–387; 209/900

[56] References Cited

U.S. PATENT DOCUMENTS

| | | | |
|---|---|---|---|
| 3,890,509 | 6/1975 | Maxey | 250/561 |
| 3,932,755 | 1/1976 | Sagawa | 250/349 |
| 4,011,447 | 3/1977 | Henderson | 250/222 |
| 4,112,309 | 9/1978 | Nakajawa et al. | 250/560 |
| 4,196,648 | 4/1980 | Jones et al. | 250/560 |
| 4,301,373 | 11/1981 | Sjodin | 250/560 |
| 4,691,100 | 9/1987 | Kizu et al. | 250/223 R |

*Primary Examiner*—David C. Nelms
*Attorney, Agent, or Firm*—Robert H. Sproule

[57] ABSTRACT

The edges of address elements such as address labels and window apertures located on a mailpiece, are detected by utilizing illumination from first and second alternating "on" and "off" light sources which illuminate the address elements at an acute angle. In the case of label detection, the edge closest to the on illuminating source generates a high contrast image, while the edge furthest from the "on" illuminating source is shadowed. In the case of illumination of an aperture, the opposite is true. That is, the light reflected from the edge which is furthest from illuminating source is high contrast, while edge closest to the illuminating source has a lower contrast. When the images generated due to edge illumination by the left and right light sources are subtracted from each other, the edges are further enhanced due to the fact that the remaining portions of the images cancel each other out.

9 Claims, 10 Drawing Sheets

APPARATUS FOR GENERATING EDGE POSITION SIGNALS FOR USE IN LOCATING AN ADDRESS ELEMENT ON A MAILPIECE

TECHNICAL FIELD

The present invention pertains to apparatus and methods for generating signals which represent edge positions of address labels and apertures on an envelope for use in determining the locations of the labels and apertures for optical character reading.

BACKGROUND OF THE INVENTION

For a number of years, optical character readers have been used at post offices to automatically read addresses containing city, state and zip code information. This address information is utilized to automatically sort incoming mail for delivery by mail carriers. However, since the position of the address on the envelope, as well as the size of the envelope may vary, it is necessary to first locate the address on each envelope before it can be optically read.

Presently, a significant number of the mailpieces utilize either address labels which are attached to the surfaces of the envelopes, or transparent windows through which the addresses are displayed.

In the present invention, signals are generated which represent the positions of the edges of labels and apertures for their use in locating the position of the address information on the mailpiece.

Conventionally, a number of detection systems have been disclosed. For example, in Maxey U.S. Pat. No. 3,890,509 there is disclosed apparatus for detecting the edges of a sawn board by means of light directed at a low angle of incidence to the board, whereby the intensity of sensed light reflected from the board varies as a function of the locations of the board edges. Furthermore, Henderson, in U.S. Pat. No. 4,011,447 discloses a device for detecting the presence of a leading edge and trailing edge of a passing object, and whereby the passing object interrupts a predetermined portion of a light beam and causes a detector/amplifier to signal the presence of the object.

Other detecting devices include U.S. Pat. No. 3,932,755 by Sagawa which pertains to an apparatus for detecting sheets of paper in a pile for paper-feeding purposes whereby when there is only one sheet of paper in the pile, a light beam passes through the single sheet and is reflected at different levels from a high-level reflecting plate and low-level reflecting plate supporting the sheet.

In addition, Nakozawa et al. in U.S. Pat. No. 4,112,309 discloses apparatus for detecting the falls of an IC chip in which a laser beam is directed onto the surface of this moving chip and whereby the light is diffracted at the falls to be detected by photosensing means.

SUMMARY OF THE INVENTION

The present invention pertains to apparatus and methods for generating a signal representing an edge of an address element, such as a raised label or a depressed aperture, which is located on a piece of mail. The edge position signals may be used for locating the position of the address element on the mailpiece for scanning by an optical character reader. The method includes the steps of providing the address element which is located adjacent to a first horizontal surface of the mailpiece and which has a second horizontal surface as well as a vertical surface located between the first horizontal surface and the second horizontal surface in a manner to form the edge. The method further includes the steps of directing an illuminative output toward the mailpiece and address element at an acute angle to the first and second horizontal surfaces. Furthermore, there is included the step of detecting light which is reflected from the address element and mailpiece in a manner that light reflected from the first and second horizontal surfaces generates first and second luminance signals of substantially equal levels, and light reflected from the vertical surface generates a third luminance signal having a level which is different than the levels of the first and second signals. An additional step includes generating first and second output signals of substantially equal levels in response to the first and second luminance signals in a manner that the first and second output signals are associated with the locations of the first and second horizontal surfaces. In addition, there is generated a third output signal, having a level which is different than the levels of the first and second output signals, in response to the third luminance signal, and which is associated with the location of the vertical surface between the first and second horizontal surfaces.

It is therefore an object of the present invention to provide a system for generating a signal which represents the location of an address element edge on a mailpiece.

BRIEF DESCRIPTION OF THE DRAWINGS

These and other objects and advantages of the present invention will become more readily apparent upon reading the following detailed description in conjunction with the attached drawings, in which:

FIG. 6A shows the surface luminous intensity when the envelope is illuminated from a source to its left, and FIG. 6B shows the surface luminous intensity when the envelope is illuminated from a source to its right;

DETAILED DESCRIPTION OF THE INVENTION

Briefly, the present invention utilizes incoherent illumination generated at an acute angle to highlight edges of an address label or address aperture (window) of an envelope. This permits the position of the label or aperture to be determined so the address may read automatically by an optical character reader or the like.

Figure 1:
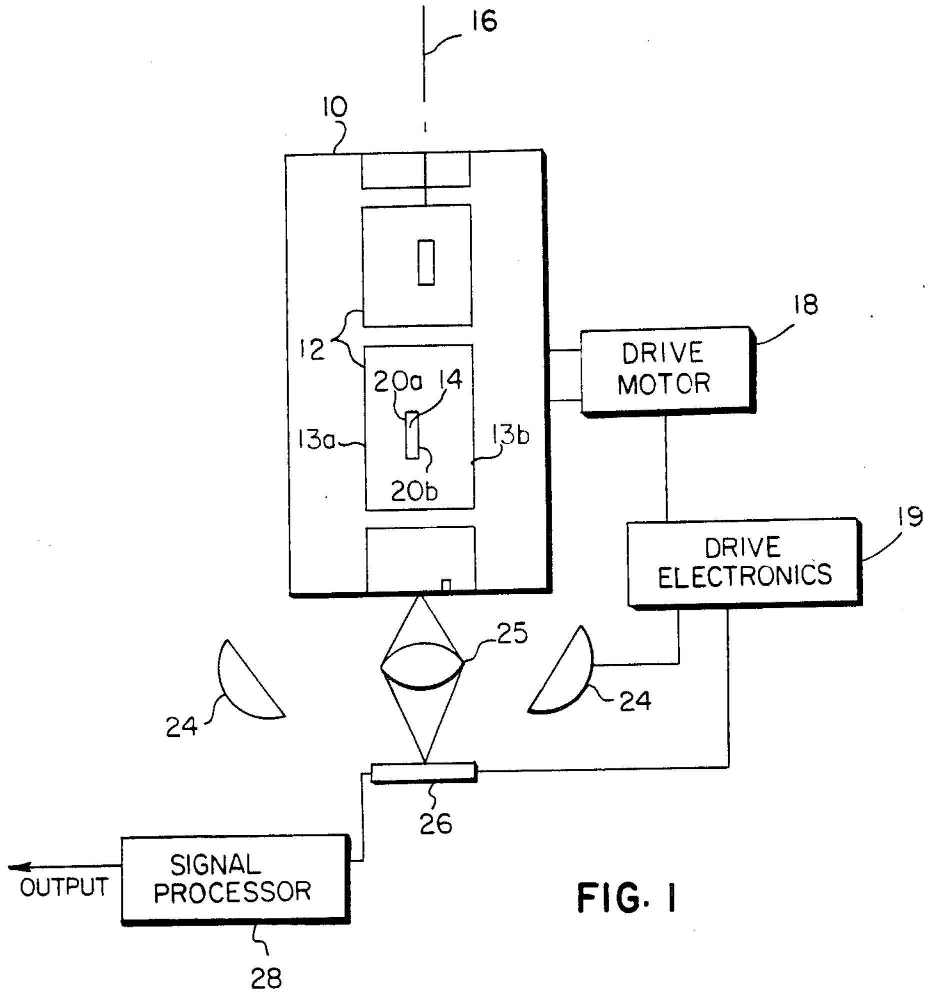
FIG. 1 is a schemmatical block diagram overview of a label/aperture detection system for generating edge position signals.

As shown in FIG. 1, the principal elements of the present invention include a conveyor 10 for transporting mailpieces 12, having left, right parallel lengthwise extending edges 13*a*, 13*b*, and including thereon address labels 14 (or apertures), in a linear direction parallel to an axis shown by a line designated by the number 16. For purposes of the present invention, the term "label" is used to refer to a raised element which is attached to the surface of the mailpiece. On the other hand, the term "aperture" refers to a typically rectangular opening in the mailpiece through which an address printed on a page inside the mailpiece appears. Furthermore, the words "label" and "aperture" are identified generically herein by the term "address element".

During movement of the conveyor 10 by means of a conventional drive motor 18 and conventional drive electronics 19, the left, right parallel lengthwise extending edges 20*a*, 20*b* of the labels are illuminated by a pair of strobe lamps 24, with the resulting image of the address element being focused by a conventional lens system 25 onto a conventional image sensor 26 which is located above the mailpiece and which scans in a linear direction normal to axis 16. Sensor 26 converts the incoming images to electrical signals which are processed and enhanced by a signal processor 28 for their later use, i.e., to determine the location of the address element on the mailpiece.

Figure 2:
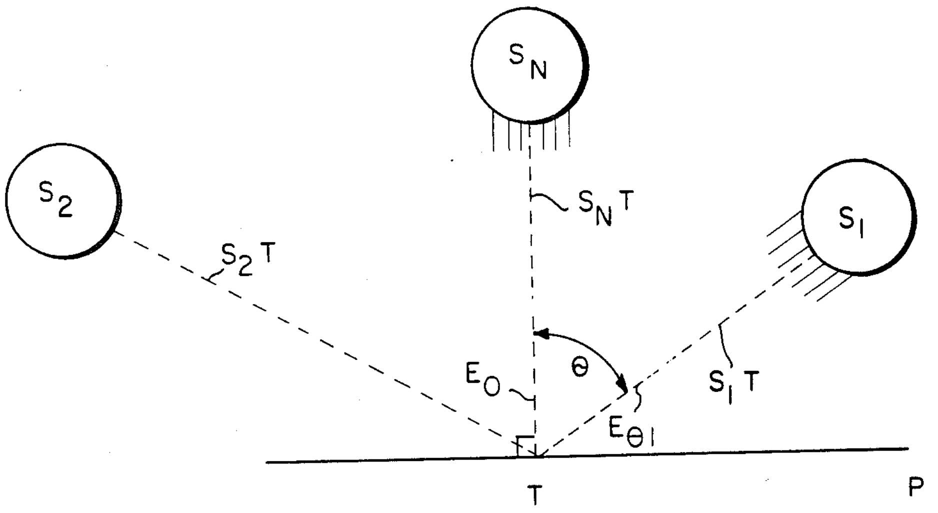
FIG. 2 shows light rays $S_1T$, $S_2T$ and $S_NT$ illuminating a point T on a plane P.

In order to better understand the present invention, an analysis of the effect of lighting angle on edge brightness is presented. With reference to FIG. 2, three light sources S1, S2, $S_N$ are shown illuminating an ideal diffuse (Lambertian) white surface P. For sources S1, S2 and $S_N$ of equal light intensity, the illumination $E_\theta$ produced at an underlying point T on surface P by grazing light from source $S_1$, for example, is proportional to the cosine of an angle $\theta$; where $\theta$ is an angle measured between a ray $S_1T$ generated from source $S_1$ and a ray $S_NT$ which is generated normal to plane P from the light source $S_N$. In other words, the illumination $E_{\theta 1}$ of point T by light source $S_1$ is found by the equation $E_{\theta 1}=E_0\cos\theta$, where $E_0$ is the illumination generated at point T by light source $S_N$.

It is further known that illumination $E_\theta$ (candles per sq. ft.)=luminance x reflectance/$\pi$. Neglecting reflectance losses, i.e., reflectance is set equal to one, then $E_\theta=\pi L_\theta$, where $L_\theta$ is the value of surface luminance. By substitution, $L_\theta=(E_0/\pi)\cos\theta$.

Therefore, denoting surface luminance of point T due to $S_1T$ and $S_NT$ as $L_1$ and $L_N$ respectively, we determine that $L_1=(E_0/\pi)\cos\theta$ and $L_N=E_O\cos(0°)/\pi=E_O/\pi$.

Figure 3:
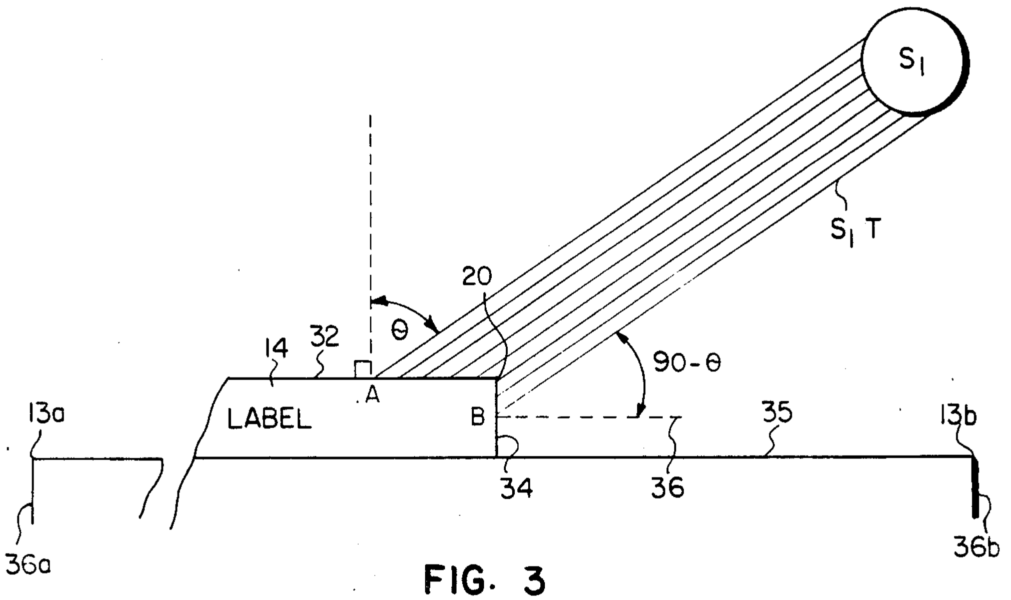
FIG. 3 is a simplified diagram of a label located on a planar envelope surface in order to illustrate the effect on surface luminance of grazing light which illuminates the raised label.

Now, in order to formulate an expression for the label edge illumination as a function of the light angle $\theta$, reference is made to FIG. 3 which shows a magnified side view of the address element (label) 14 having a top horizontal surface 32 and vertical side surface 34 which intersects with top surface 32 at the edge 20. In this embodiment, the label is located on a mailpiece having a top horizontal surface 35 and left, right vertical sides 36*a*, 36*b*; the intersections of the side surfaces 36*a*, 36*b* with the top surface 35 forming the left, right edges 13*a*, 13*b*. For the purposes of the present description, it should be appreciated that the terms "horizontal" and "vertical" are used to describe relative locations of the elements to each other rather than describing their positions in an absolute sense.

At a point A on the top surface 32 of the label, its surface luminance is expressed by the equation $L_A=(E_0/\pi)\cos\theta$, where $L_A$ is the luminance of point A due to source S1. Furthermore, at a point B on the vertical side 34 which is also illuminated by light source $S_1$, its surface luminance, $L_B$, is expressed by the equation $L_B=(E_0/\pi)\cos(90-\theta)$, where $(90-\theta)$ is the angle of the light rays $S_1T$ illuminating point B. This angle $\theta$ is measured from an imaginary line designated by the number 36 which is normal to vertical side 34. Since the contrast (brightness) of edge 20 is a function of the ratio $L_B/L_A$, this ratio can be expressed by the equation $L_B/L_A=[(E_0/\pi)\cos(90-\theta)]/[(E_0/\pi)\cos\theta)=\tan\theta$.

It is apparent, therefore, that there is a difference in surface luminance between i) the vertical side 34, and ii) the horizontal top surface 32 of the label and the horizontal surface 35 of the mailpiece as a result of light which is incident at an acute angle to these surfaces 32, 35; the luminance of the mailpiece surface 35 being approximately equal to the luminance of label surface 32. It is furthermore apparent from knowledge of the tangent function that this contrast in surface luminance increases with increases in the angle $\theta$ above 45°. That is, the luminance of side 34 increase over that of horizontal surfaces 32, 35 with an increase in angle $\theta$ when $\theta$ is greater than 45°. It is this difference in surface luminance between the side surface 34 and horizontal surfaces 32, 35 which is utilized in the present invention to locate the edge of the label.

Figure 4A:
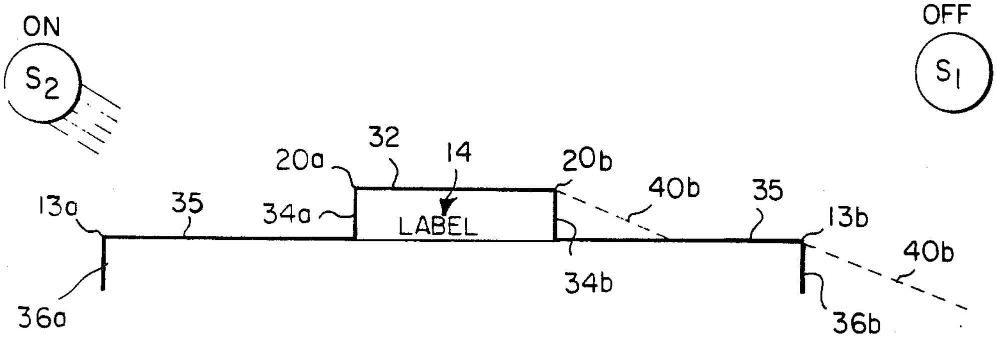
FIGS. 4A and 4B are simplified diagrams showing how alternating light sources $S_1$ and $S_2$ produce bright edges and shadows at opposite edges of the label and mailpiece.

In order to detect the edges of the envelope and label, in the present embodiment shown in FIG. 4, two light sources, $S_1$ and $S_2$, located outboard of the lengthwise extending edges 13 of the envelope, are utilized. In a preferred embodiment, the "on" periods of the lights $S_1$ and $S_2$ are alternated, with the signals formed by the detected difference in luminance due to each alteration being subtracted from each other to generate an output signal which is representative of locations of the envelope edges and label edges.

More specifically, utilizing alternating light sources, light from the left lamp $S_2$ illuminates the left side 36*a* and top surface 35 of the envelope, as well as the left side 34*a* and top surface 32 of the label. This results in high level contrast signals being developed to distinguish edges 20*a*, 13*a*, in the manner discussed previously with reference to FIG. 3. At the same time, source $S_2$ creates a shadow, shown by dashed lines identified by the numbers 40*b*, beyond the opposite right label edge 20*b* and envelope edge 13*b*, so that effectively almost no light is reflected from label right side 34*b* and envelope right side 36*b*. This results in much lower contrast signals being developed to distinguish label right edge 20*b* and envelope right edge 13*b*.

In this embodiment, light sources $S_1$ and $S_2$ are "on" for equal periods of time during each alteration, with the resulting contrast image being detected by the imager 26.

Figure 4B:
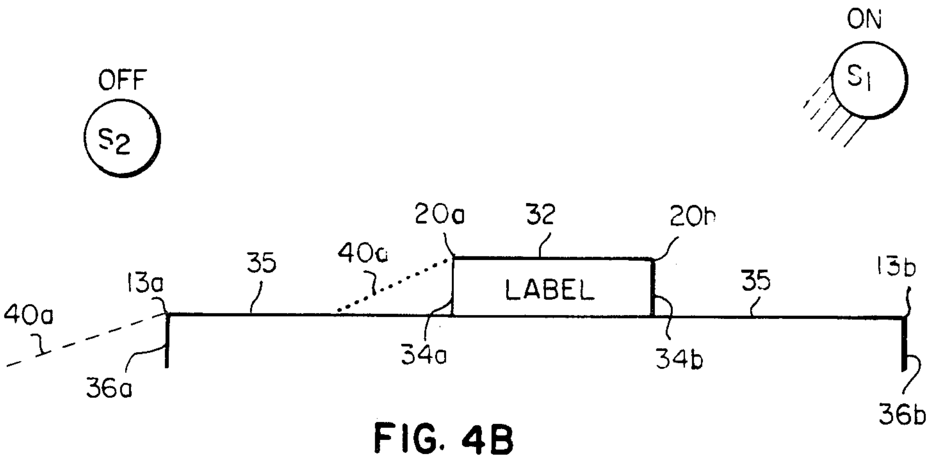

Alternating the lamps produces the opposite effect as shown in FIG. 4B. That is, when right lamp $S_1$ is "on" and the left lamp $S_2$ is "off", the envelope side 36*b* and label side 34*b* closest to source $S_1$ are illuminated. However, shadows are generated beyond the opposite label edge 20*a* and envelope edge 13*a* thereby effectively masking label left side 34*a* and envelope left side 36*a* . Thus, when source $S_1$ is "on", high level contrast signals are developed to distinguish right edges 20*b*, 13*b*, and lower level signals are generated to distinguish left edges 20*a*, 13*a*. When the contrast signals generated by illumination of the envelope and the label are stored in the memory of processor 28 and then subtracted from each other, the resulting difference image is one which has enhanced amplitude portions which correspond to the left, right edges of the envelope and label, while the remainder of the image cancels itself out. This will be explained in greater detail shortly.

Figure 5A:
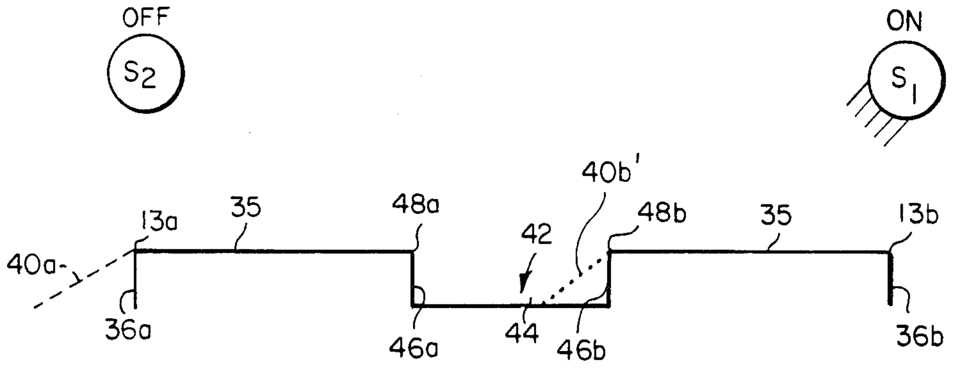
FIGS. 5A and 5B are simplified diagrams showing how alternating light sources, $S_1$ and $S_2$, generate bright edges and shadows at opposite edges of an aperture and mailpiece.
Figure 5B:
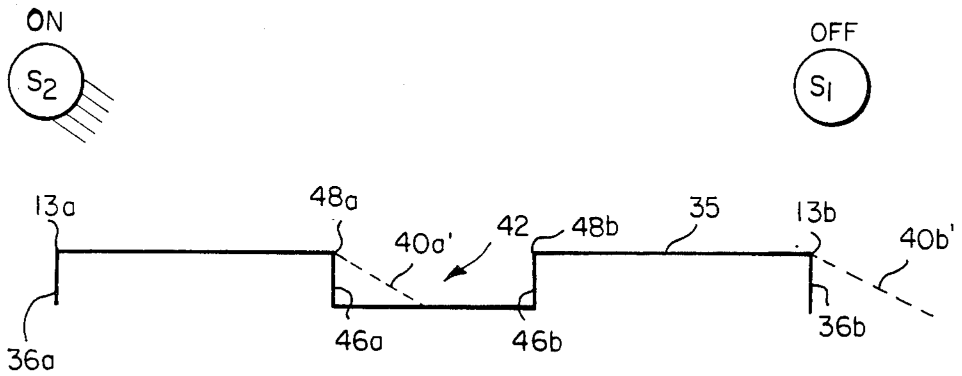

In the case when an aperture is illuminated, the results are slightly different. As shown by FIG. 5A, the aperture indicated at 42 includes a bottom surface 44, which typically might be a paper inside the mailpiece, and left, right sides 46*a*, 46*b* which upstand from the bottom surface 44 and which intersect with mailpiece top surface 35 to form left, right edges 48*a*, 48*b*. Thus, when the aperture 42 is illuminated by the right source $S_1$, for example, the mailpiece right side 36*b* is illuminated and the mailpiece left side is shadowed. However, at the same time, the aperture left side 46*a* is illuminated and the aperture right side 46*b* is shadowed as shown by the dashed line 40*b*'. Alternating the light sources so that $S_1$ is "off" and $S_2$ is "on", produces the opposite result as shown in FIG. 5B. However, when the aperture edge contrast signals generated due to illumination from the left and right sources are subtracted from each other, only the portions of the signal corresponding to the edges are enhanced, with the remaining portions of the signal cancelling each other out. For reasons which will become clearer shortly, this was the case previously with reference to FIGS. 4A and 4B when the label was illuminated.

Figure 6A:
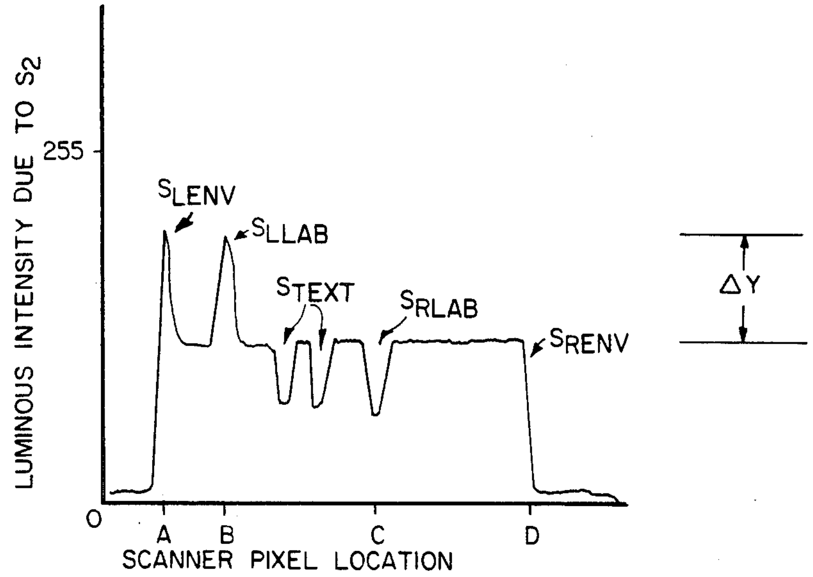
FIGS. 6A and 6B are idealized output signals of surface luminous intensity as a function of scanner pixel location for one scan of an envelope with an attached label, and more specifically
Figure 6B:
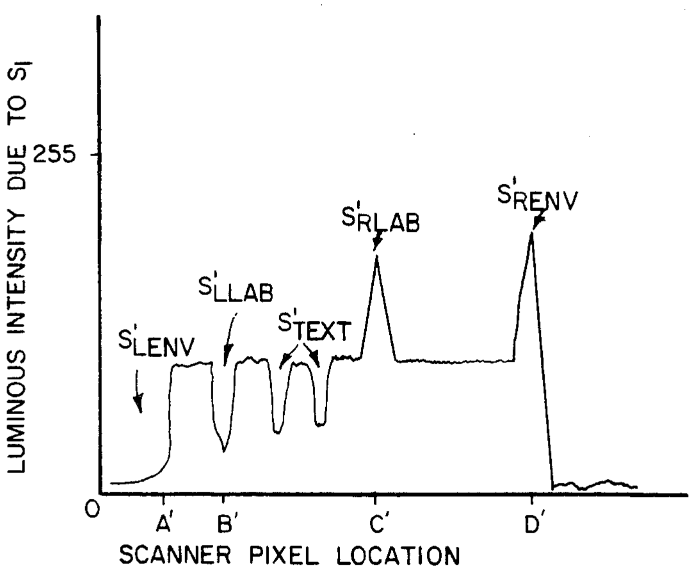

The generation of edge position signals is set forth in greater detail with reference to FIGS. 6A and 6B. In FIG. 6A, there is shown a graph of contrast intensity as a function of imager pixel location due to the operation of left lamp $S_2$ during a single scan of a label and envelope. On the other hand, in FIG. 6B, there is shown a graph of contrast intensity as a function of imager pixel location due to operation of right lamp $S_1$. As can be seen by FIGS. 6A and 6B, the contrast intensities of a majority of the flat area of the envelope and label including envelope top surface 35, label top surface 32 and aperture bottom surface 44, remain essentially constant except for area of text, i.e., address information, which is indicated by signals $S_{TEXT}$, $S'_{TEXT}$ in FIGS. 6A and 6B. When illuminated by the left light $S_2$, the label left edge 20*a* and envelope left edge 13*a* generate increased contrast intensity signals $S_{LENV}$ and $S_{LLAB}$ (FIG. 6A) at pixel positions A and B. At the same time, the shadowed label right edge 20*b* and the shadowed envelope right edge 13*b* generate low intensity contrast signals $S_{RLAB}$ and $S_{RENV}$ at pixel positions C and D. On the other hand, when illuminated by the right light $S_1$, label, envelope right edges 20*b*, 13*b*, generate increased contrast intensity signals $S'_{RLAB}$ and $S'_{RENV}$ at positions C' and D' as shown in FIG. 6B, while the shadowed label left edge 20*a* and shadowed envelope left edge 13*a* generate much lower contrast intensity signals $S'_{LLAB}$ and $S'_{RLAB}$ at positions A' and B'.

It should be noted that positions A', B', C', and D' of FIG. 6B represent a slight shift from positions A, B, C, and D of FIG. 6A due to movement of the envelope during the time the address element is illuminated from the left and right sources. However, since the amount of movement during this time is so slight, little error is introduced when the signals of FIGS. 6A and 6B are subtracted.

It should be appreciated that each pixel address may be generated in processor 28 by means of a line counter which generates a new count for each line scanned by the imager 26, as well as by a pixel counter which generates a new count for each pixel scanned. These pixel positions may be stored in a frame store and recalled later to provide the address locations of the edges.

Figure 7:
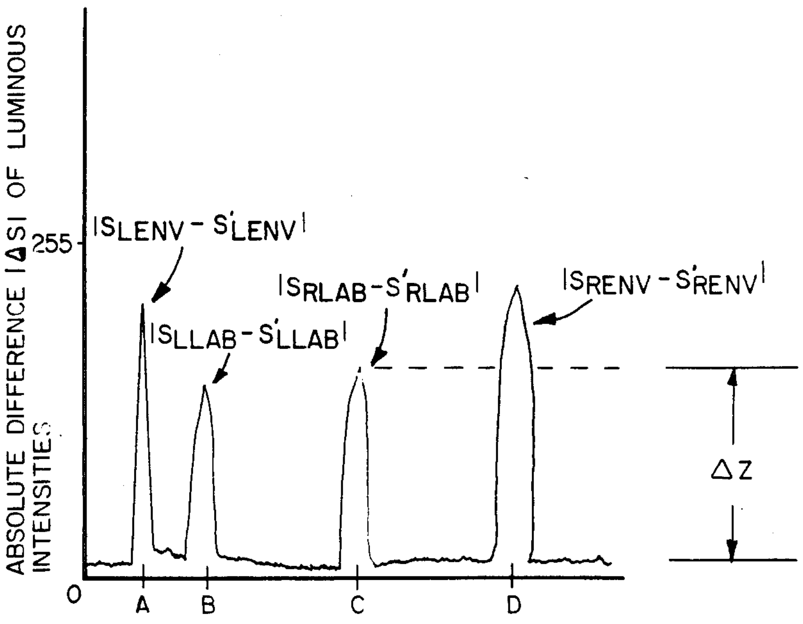
FIG. 7 is an idealized graph of an image difference signal as a function of scanner pixel location which is generated when the signals in FIGS. 6A and 6B are subtracted from each other.

When the contrast intensity signals represented in the graphs in FIGS. 6A and 6B are subtracted from each other and the absolute value of the signal is determined, a signal $|\Delta S| = |S2 - S1|$ shown graphically in FIG. 7 is generated. In this manner, the contrast intensity signals representing the positions of the label edges and envelope edges are enhanced, while the contrast intensity signals representing the remaining flat areas of the label and envelope, as well as text information, cancel each other out. For example, the high level signal $S'_{RENV}$ (FIG. 6B), which represents the right edge of the envelope at position D' when illuminated by the right light source $S_1$, is subtracted from the lower level signal $S_{RENV}$, which represents the left edge of the envelope at position D when illuminated by the left light source S2. This generates an even greater enhanced difference signal. More specifically, further enhancement of the edge signals result due to the cancelling out of the text and non-edge related information. That is, prior to subtraction, the difference (FIG. 6A) in amplitudes between the contrast signals representing the flat areas of the label/aperture and the upper extent of the edge signals may be represented by a distance $\Delta Y$. However, after subtraction, this difference in amplitudes between the flat areas and the upper limit of the edge signals is represented by the distance $\Delta Z$ in FIG. 7 which is greater than $\Delta Y$ due to mutual cancellation of the flat areas. Thus, an improved signal for locating the edges is provided.

Having provided an overview of the of the present invention, the details of its implementation now will be discussed. Scanning of the mail pieces is accomplished by the imager 26 which in an exemplary embodiment is a digital camera such as the Eikonix Model 78/99. This camera is a high resolution linear array digital camera with 2,048 photodiode elements which are located generally perpendicular to axis 16. In this embodiment, the mailpiece is stationary and the array is mechanically driven by means of a stepper motor (not shown) in a direction parallel to axis 16 to acquire image plane information in two dimensions. Each element returns a signal intensity which is digitized into 12 bits. In this embodiment, a field is divided into 2,048 lines with each mailpiece being scanned twice; that is, once when illuminated from the left by source $S_2$ and once when illuminated from the right by source $S_1$. Assuming that the velocity of each mailpiece along conveyor 10 is about one hundred inches per second, a resolution of at least two hundred and fifty samples per inch is required.

Illumination of the mail pieces is accomplished by the lamps 24 which are positioned above and at opposite sides of the conveyor 10. In an exemplary embodiment, each lamp 24 is a 120V, 250W tungsten-halogen light bulb located in close proximity to a metal reflector. An optimum angle $\theta$ of illumination is selected to be between about 65° and 75°, and preferably about 70°. Illumination angles much greater than 75° provide increased intensity signals, however, this also can result in spurious signals in the event the mailpiece is creased or slightly bent. Assuming that the linear array imager samples at a rate of ten lines per inch, each source $S_1$ or $S_2$ flashes for equal periods at a rate of about one thousand flashes per second.

Figure 8:
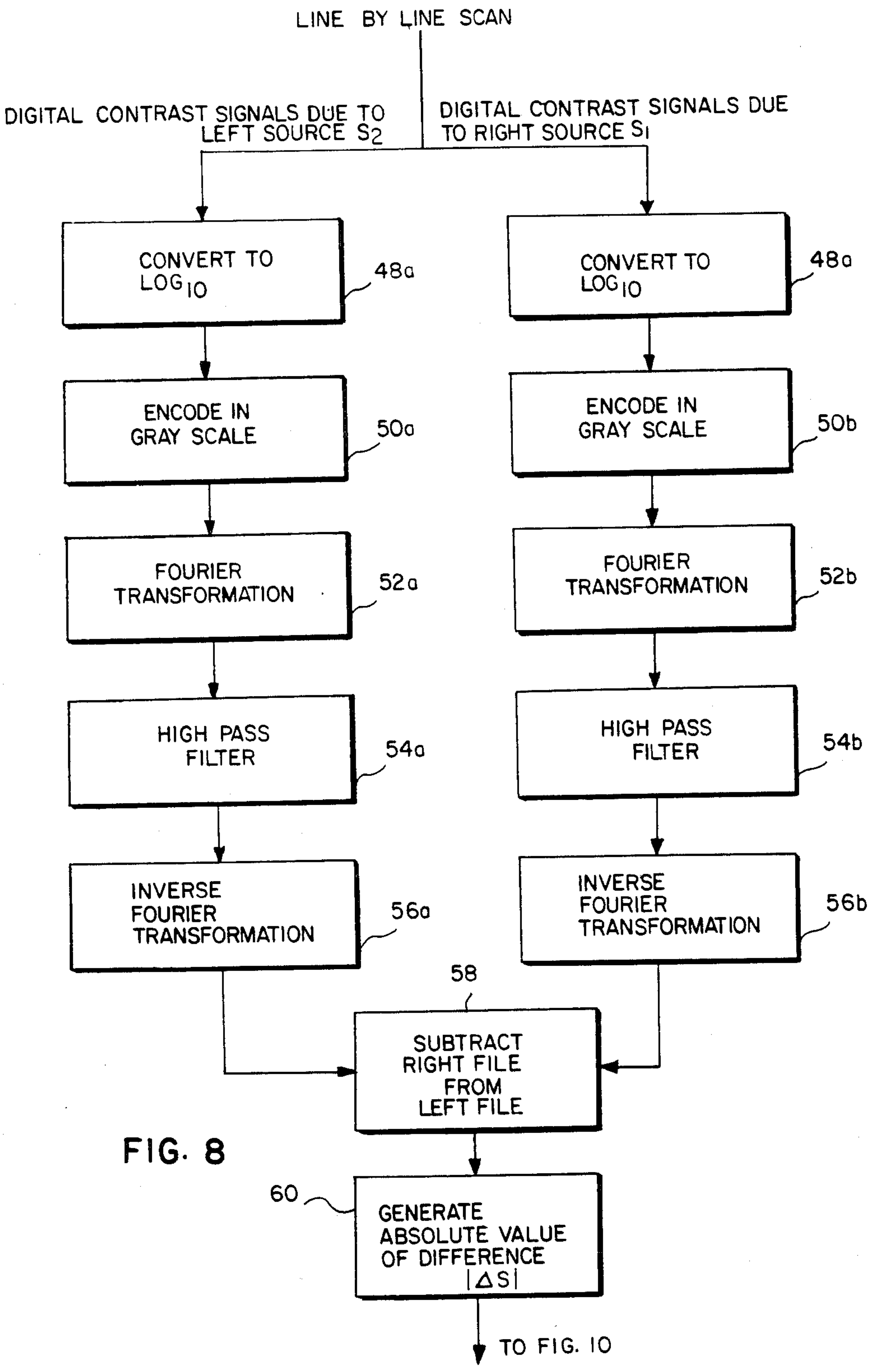
FIG. 8 is a flowchart showing the sequence of signal processing functions performed on the luminous intensity signals up to and including their subtraction.

Referring now to the flowchart in FIG. 8, image signals from the image sensor generated due to illumination by the left source $S_2$ and right source $S_1$ are fed along separate channels to the signal processor 28. In this description, the left channel blocks are identified by numbers with an "a" suffix attached, and the right channel blocks are identified by numbers with a "b" suffix attached. In an exemplary embodiment, the processor 28 includes a MicroVax II minicomputer manufactured by Digital Equipment Corp., which is interfaced with a CSPI Mini Map array processor to process the left and right channel data in separate files. Initially, luminous signals for each file of data from the imager 26 are put through a logarithmic look-up table at blocks 48 and converted to their logarithmic base ten equivalent. This conversion increases the contrast of the image signals in the darker areas of the mailpiece, while lowering their contrast in the lighter areas of the mailpiece. This lessens the effect of shadows caused by folds, creases, etc. in the mailpieces. Further image enhancement is accomplished by encoding the image signals in a conventional manner in gray scale from 0 through 255 at blocks 50.

Subsequently, each line is conventionally Fourier transformed in two dimensions at blocks 52, then filtered at blocks 54 to remove all low frequencies, i.e., signals typically related to false edges such as bends or creases, and then inverse Fourier transformed back at blocks 56. Image processing utilizing a Fourier transformation and subsequent filtering are discussed in *Digital Image Processing,* R. C. Gonzalez, 1977, pp. 36-88; as well as *Digital Image Processing Techniques,* M.P. Ekstrom, 1984, pp. 18-25, the contents of *Digital Image Processing and Digital Image Processing Techniques* being incorporated herein by reference.

Upon conclusion of the aforementioned image signal preprocessing, the left and right luminous signals are subtracted as discussed previously at subtractor block 58. After the resulting difference signals are calculated, the absolute value of those difference signals are then determined to produce a measure of the difference in intensity levels.

Figure 9:
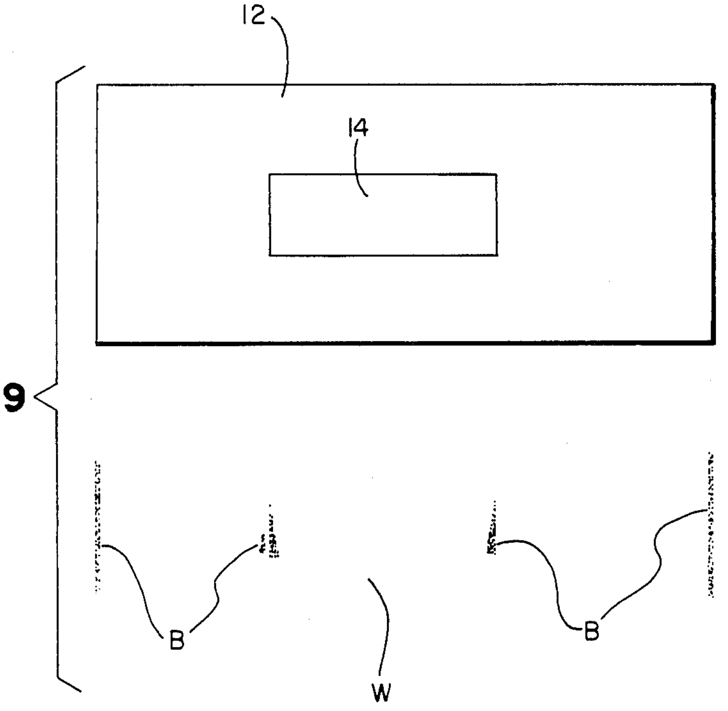
FIG. 9 is a visual image of the binarized difference data which is located below a picture of the corresponding mailpiece with attached label.
Figure 10A:
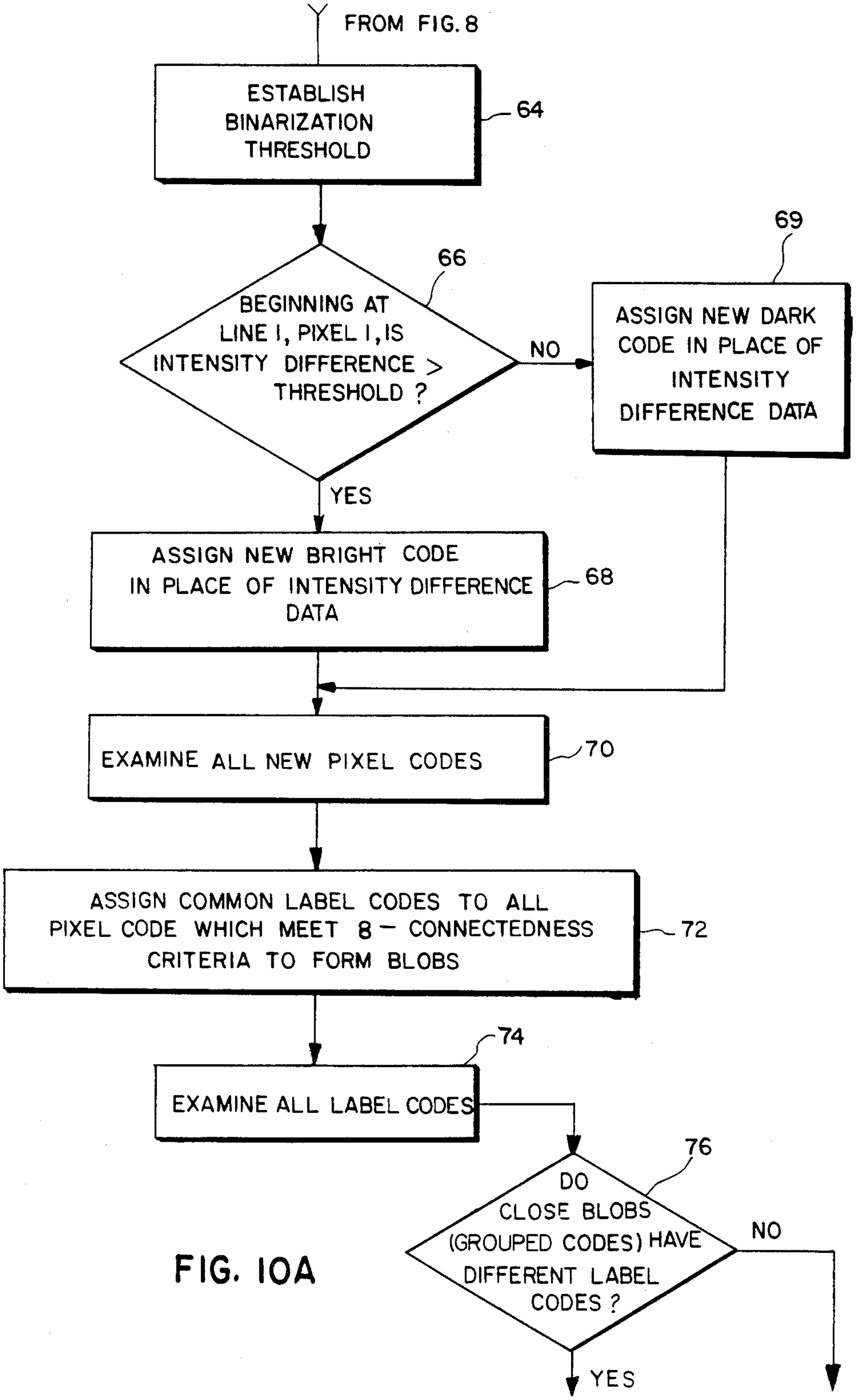
FIGS. 10A, 10B and 10C are flowcharts showing the sequence of signal processing functions performed on the difference signals to locate the positions of the label and envelope edges.
Figure 10B:
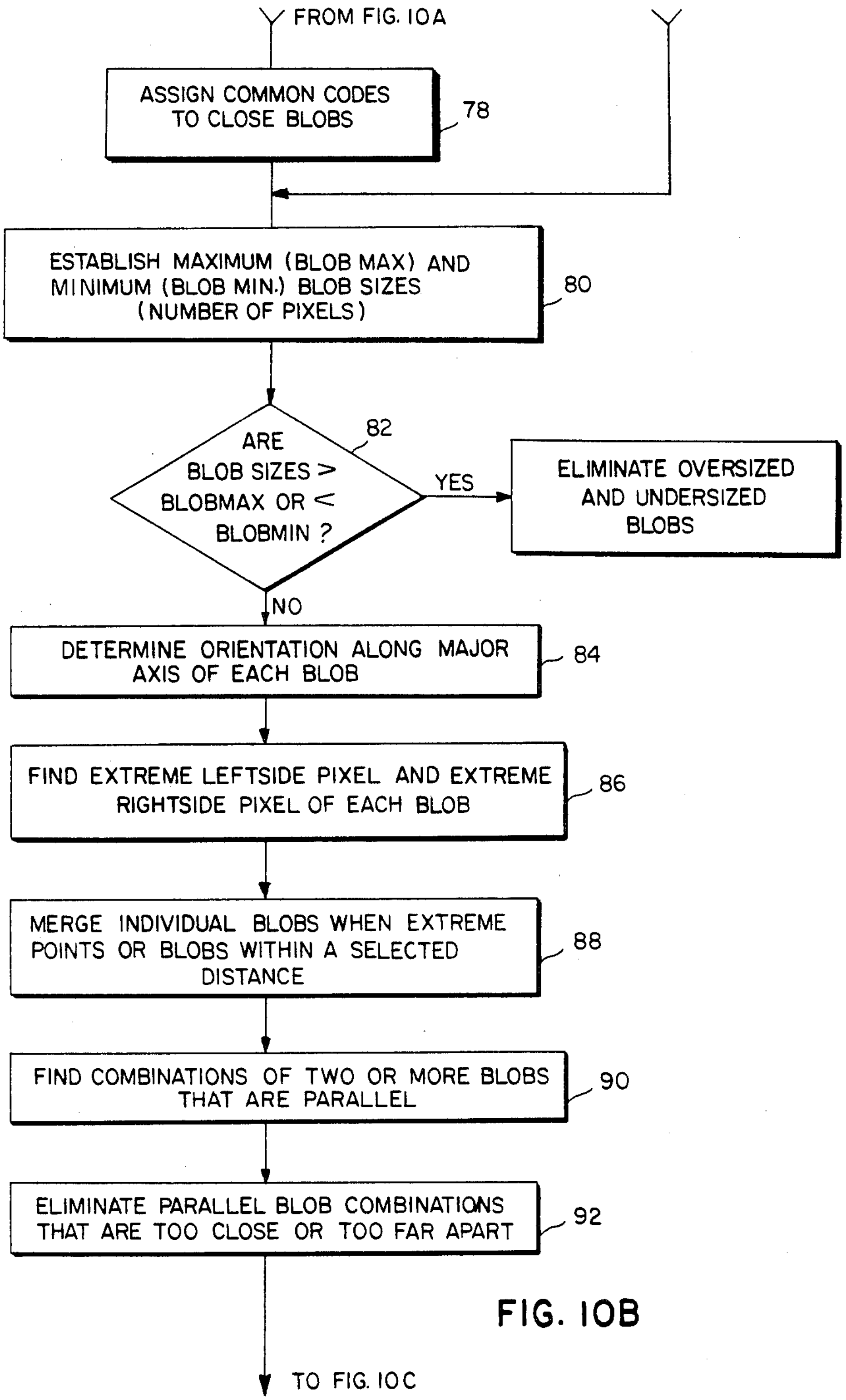
Figure 10C:
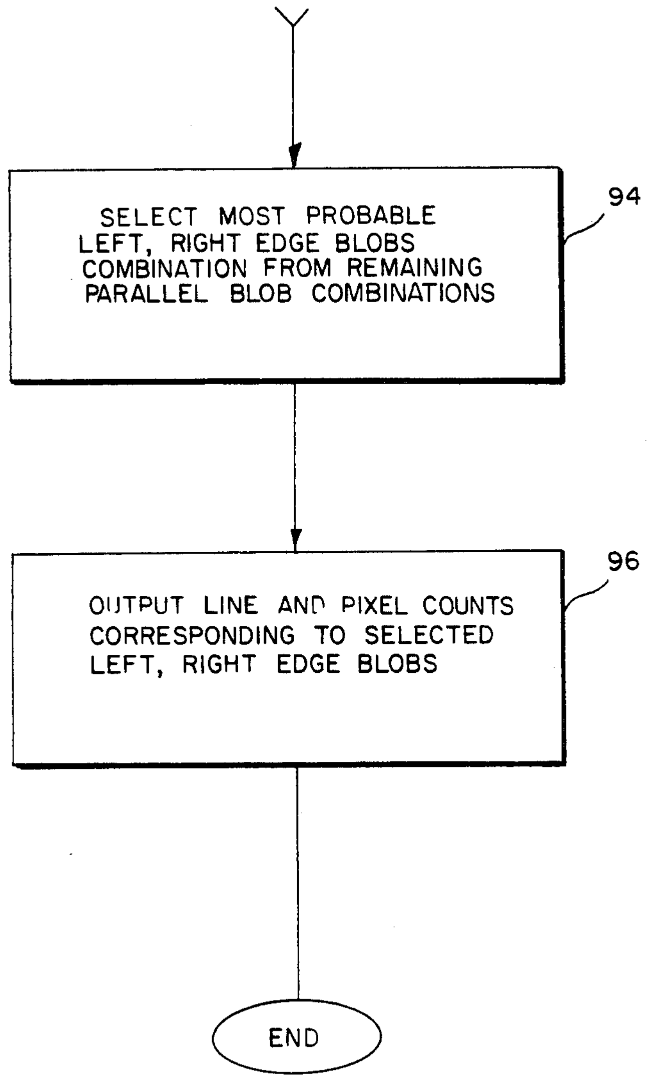

Further image processing of the difference signal is then accomplished in order to better separate the edge signal portions from any remaining noise and spurious signals such as those caused by shadows, creases or folds in the mailpiece, and to generate more accurate edge position information. More specifically in the present invention, prior to connected component encoding, the data is binarized so as to define all of the difference levels in terms of either a bright code or a dark code. Binarization in conjunction with connected component digital image processing is also described in *Digital Imaging Processing Techniques* at pages 274 to 279. Referring now to the flowchart beginning at FIG. 10A, a binarization intensity threshold of about 170 is selected at flowblock 64. This threshold has been determined to adequately reflect the intensity difference that corresponds to an edge. Beginning with the difference intensity value representing the first pixel position of the first scan line, and proceeding through pixels one through n of each line one through m, a determination at decision block 66 is made whether these values exceed the selected threshold. Each eight bits of intensity data is then reassigned a new value. That is, all of those intensity signals which exceed the threshold are assigned a "bright" (such as binary one) common code value at flowblock 68 in place of their intensity level data; whereas those intensity signals which do not exceed the threshold are assigned a common "dark' code (such as binary zero) at flowblock 69. In this manner, all of the pixel positions are either represented by a bright code value or a dark code value. A visual representation of the binarized data positioned below the mailpiece 12 and label 14 is shown in FIG. 9 where the black areas identified by the letter "B" correspond to label codes which exceed the binarization threshold, and the remaining white areas identified by the letter "W" correspond to label codes which do not exceed the binarization threshold.

To better determine where the edges lie, boundary determination techniques such as the conventional procedure of connected component processing are utilized. Connected component encoding is also discussed in *Digital Image Processing* at pages 347-348. In this manner, contiguous points (binarized data) in the image plane which have similar properties are used to define a boundary or edge. In order to accomplish this, code values from flowblock 69 are reexamined at flowblock 70 to determine whether the pixel code under test has a bright code neighbor as set forth in conventional eight-connectedness criteria. All label codes which meet this criteria, i.e., are determined to be connected, are assigned common label codes at flowblock 72, and referred to herein as "blobs". These blobbed label codes are then examined at a flowblock 74 to determine whether there are any closely spaced blobs having different label codes. If it is determined at flowblock 76 that two blobs are closer than about one quarter of an inch, these closely spaced blobs are assigned common label codes at flowblock 78.

Further processing involves establishing maximum and minimum blob sizes at flowblock 80. That is, it is determined that blobs having pixel sizes less than about 80 pixels are not large enough to represent edges; and if greater than about 4,000 pixels, are too large to represent label edges (most likely representing spurious shadows). Thus, at decision block 82, if it is determined that a blob is above the maximum blob size (blobmax) or under the minimum blob size (blobmin), that blob is eliminated from further consideration. This reduces the number of blobs down to a range between about five and about thirty.

A blob which is within the aforementioned parameters is further processed at flowblock 84 to determine its orientation along its major axis. Orientation of each blob is determined in a conventional manner by calculating the eigenvectors of the second-moment matrix of the blob.

Once the orientation of the blob is determined, then the extreme left pixel position and extreme right pixel position of each blob is identified at block 86. This in effect determines the left and right sides of the outer perimeter of a quadruped which represents the label/aperture. Further merging of the blobs is accomplished at flowblock 88 by merging those blobs which have extreme left or right side pixels within about one quarter of an inch of each other to further reduce the remaining blob count. With regard to the merging of the blobs utilizing the extreme points, the blobs are first processed to determine their center of mass, their extreme points and their rough orientation, i.e., the slope of the dominant eigenvector of the second-moment matrix. In the process of merging, their masses are added, their extreme points are modified, and their orientation is recomputed as a weighted average.

The remaining processing steps involve defining pairs of remaining blobs which may represent possible left and right edges of the label/aperture, and then selecting the blob pair which is most likely to represent the label/aperture sides. More specifically, at flowblock 90, a determination is made whether two or more blobs are parallel to each other. If this test is satisfied, then the blob pair is considered a candidate left and right edge. Further reduction in the number of candidate blob combinations is accomplished by eliminating those parallel blob combinations that are too close or too far apart. That is, those blob pairs that are closer than about one half inch or further apart than about four inches and which therefore do not fall within the likely distance parameters between left and right edges of a label/aperture, are eliminated from further consideration at flowblock 92.

For the purpose of the present invention, parallel blobs are defined to be those which are parallel to each other within a tolerance of about plus or minus 30° so as to include those apertures having rounded edge corners. Also, to insure that the quadruped determined by two parallel blobs is rectangular, either the corresponding tops or bottoms of the blobs are required to be no more than 25 lines (1") apart.

From the remaining parallel blob combinations, the most probable combination which represents the left and right edges of the label are selected. Typically, this is accomplished by comparing each of these combinations to a preselected criteria for likely location, size and orientation of a label on a mailpiece. For example, a true label/aperture is probably near the center of the mailpiece and most probably aligned with the edges of the mailpiece. The blob combination which most closely corresponds to these sets of criteria is selected as being representative of the left and right edges of the label/aperture at flowblock 94.

The location of the label/aperture on the mailpiece is then obtained by outputting at flowblock 96 the line and pixel counts from memory which correspond to the selected left and right edge blobs.

What is claimed is:

1. Apparatus for generating signals which are representataive of edges of an address element which is located adjacent to a substantially horizontal surface of a mailpiece, the address element including a first substantially horizontal surface as well as first and second substantially vertical side surfaces which are located between the first horizontal surface and the second horizontal surface so as to form the edges, the apparatus comprising:

a. illumination means including
  (1) first light means for generating a first illuminative output directed toward the address element in a first direction and at an acute angle to the horizontal surfaces of the address element and the mailpiece, and
  (2) second light means for generating a second illuminative output directed toward the address element in a second direction and at an acute angle to the horizontal surfaces of the address element and the mailpiece, the first light means and the second light means being positioned so that the address element is located therebetween;

b. detection means including
  (1) first means for (i) detecting light reflected from the address element generated by the first light means in a manner that light reflected from the horizontal surfaces generates a first signal having a first level, light reflected from the first side generates a second signal having a second level which is greater than the first level, and light reflected from the second side generates a third signal having a third level which is less than the first level, and (ii) for generating a first output of the first, second and third signals, and
  (2) means for (i) detecting light reflected from the address element generated by the second light means in a manner that light reflected from the horizontal surfaces generates a fourth signal having a fourth level, light reflected from the second side generates a fifth signal having a fifth level which is greater than the fourth level, and light reflected from the first side generates a sixth signal having a sixth level which is less than the fourth level, and (ii) for generating a second output of the fourth, fifth and sixth signals; and c. signal difference means including means for generating a difference between the levels of the second output and the first output in a manner that (i) a difference between the first signal and the fourth signal generates a first difference signal which has a level which is lower than that of the first signal and the fourth signal, (ii) a difference between the third signal and the fifth signal generates a second difference signal which has a level that is greater than the first difference signal and which is representative of the location of the second edge, and (iii) a difference between the second signal and the sixth signal generates a third difference signal which has a level that is greater than the first difference signal and which is representative of the location of the first edge.

2. The apparatus as set forth in claim 1 wherein the signal difference means includes means for generating a difference between the second output and the first output in a manner that (i) a level difference between the first difference signal and the second difference signal is greater than a level difference between the fifth signal and the fourth signal, and (ii) a level difference between the first difference level and the third difference level is greater than a level difference between the second signal and the first signal.

3. The apparatus as set forth in claim 2 wherein:

a. the first level and the fourth level are substantially equal; and b. the signal difference means includes means for generating the difference between the first level and the fourth level in a manner that the first difference signal has a level of substantially zero.

4. The apparatus as set forth in claim 2 wherein:

a. the address is formed by the first horizontal surface and the first and second side surfaces which extend upward from the mailpiece horizontal surface;

b. the illumination means includes means for operating the first light means and the second light means in a manner that the first illuminative output and the second illuminative output are not present at the same time; and c. the first light means and the second light means are positioned (i) so that the first side surface faces the first light means in a manner that the first illuminative output illuminates the horizontal surfaces and the first side to generate the first and second signals, but the first illuminative output does not illuminate the second side in order to generate the third signal, and (ii) so that the second side faces the second light means in a manner that the second illuminative output illuminates the horizontal surfaces and the second side to generate the fourth and fifth signals, but the second illuminative output does not illuminate the first side in order to generate the sixth signal.

5. The apparatus as set forth in claim 3 wherein:

a. the address element is formed by the first horizontal surface and the first and second side surfaces which extend down from the mailpiece horizontal surface;

b. the illumination means includes means for operating the first light means and the second light means in a manner that the first illuminative output and the second illuminative output are not present at the same time; and c. the first light means and the second light means are positioned (i) so that the second side faces the first light means in a manner that the first illuminative output illuminates the horizontal surfaces and the second side to generate the first and second signals, but the first illuminative output does not illuminate the first side in order to generate the third signal, and (ii) so that the first side faces the second light means in a manner that the second illuminative output illuminates the horizontal surfaces and the first side to generate the fourth and fifth signals, but the second illuminative output does not illuminate the second side in order to generate the sixth signal.

6. A method of generating a signal which represents an edge of an address element, the method comprising the steps of:

a. providing an address element which is located adjacent to a horizontal surface of a mailpiece and which has a horizontal surface as well as a vertical surface located between the mailpiece horizontal surface and the address element horizontal surface in a manner to form the edge;

b. directing an illuminative output toward the mailpiece and address element at an acute angle to the horizontal surfaces;

c. detecting light reflected from the address element and mailpiece in a manner that light reflected from the mailpiece and address element horizontal surfaces generates first and second luminance signals of substantially equal levels, and light reflected from the vertical surface generates a third luminance signal having a level which is different than the levels of the first and second signals; and d. generating (i) first and second output signals of substantially equal levels in response to the first and second luminance signals in a manner that the first and second output signals are associated with the locations of the mailpiece and address element horizontal surfaces, and (ii) a third output signal, having a level which is different than the levels of the first and second output signals, in response to the third luminance signal and which is associated with the location of the vertical surface between the mailpiece and address element horizontal surfaces.

7. The method as set forth in claim 6 wherein:

a. the acute angle is less than 45°; and b. the third luminance signal has a level that is greater than the levels of the first and second signals.

8. The method as set forth in claim 6 wherein the edge is formed by an intersection of the address element horizontal surface and the vertical surface which is characterized in that it upstands from the mailpiece horizontal surface.

9. The method as set forth in claim 6 wherein the edge is formed by an intersection of the mailpiece horizontal surface and the vertical surface which is characterized in that it depends downward from the mailpiece horizontal surface to the address element horizontal surface.

* * * * *